US012560493B2

(12) United States Patent
Furukawa et al.

(10) Patent No.: US 12,560,493 B2
(45) Date of Patent: Feb. 24, 2026

(54) TEMPERATURE DETECTION DEVICE

(71) Applicant: Prime Planet Energy & Solutions, Inc., Tokyo (JP)

(72) Inventors: Kimihiko Furukawa, Kakogawa (JP); Masato Nakayama, Akashi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 364 days.

(21) Appl. No.: 18/317,104

(22) Filed: May 15, 2023

(65) Prior Publication Data

US 2023/0366748 A1 Nov. 16, 2023

(30) Foreign Application Priority Data

May 16, 2022 (JP) ................................. 2022-080327

(51) Int. Cl.
 *G01K 7/24* (2006.01)
(52) U.S. Cl.
 CPC ....................................... *G01K 7/24* (2013.01)
(58) Field of Classification Search
 None
 See application file for complete search history.

(56) References Cited

U.S. PATENT DOCUMENTS

2020/0395641 A1* 12/2020 Suzuki ..................... G01K 7/24

FOREIGN PATENT DOCUMENTS

| JP | 2004-325110 A | 11/2004 |
| JP | 2006-010677 A | 1/2006 |
| JP | 2019-029141 A | 2/2019 |
| JP | 2020-141457 A | 9/2020 |

* cited by examiner

*Primary Examiner* — Erica S Lin
(74) *Attorney, Agent, or Firm* — HAUPTMAN HAM, LLP

(57) ABSTRACT

A temperature detection device includes a first voltage divider circuit including a first temperature sensor and a first pull-up resistor connected in series to the first temperature sensor, a second voltage divider circuit including a second temperature sensor and a second voltage divider circuit including a second temperature sensor and a second pull-up resistor connected in series to the second temperature sensor, and a controller. The first pull-up resistor has a resistance value corresponding to that of the first temperature sensor that is at a first temperature. The second pull-up resistor has a resistance value corresponding to that of the second temperature sensor that is at a second temperature being lower than the first temperature. The controller selects outputs of the voltage divider circuits according to a temperature of a measurement point detected based on a voltage of the first temperature sensor.

12 Claims, 5 Drawing Sheets

TEMPERATURE DETECTION DEVICE

CROSS REFERENCE TO RELATED APPLICATIONS

The present application claims priority from Japanese Patent Application No. 2022-080327 filed on May 16, 2022, which is incorporated by reference herein in its entirety.

BACKGROUND

The present disclosure relates to a temperature detection device.

JP 2006-010677 A discloses a temperature control device that performs temperature control based on the temperatures measured with a plurality of temperature sensors arranged inside an information processing apparatus. At least one of the plurality of temperature sensors includes a temperature sensor with higher accuracy than other ones, and the other temperature sensors include a temperature sensor with lower accuracy. The temperature control device detects the difference in measured temperature between the temperature measured by the temperature sensor with higher accuracy and the temperature measured by the temperature sensor with lower accuracy. The temperature control device presumes a value obtained by adding the difference in measured temperature to the value measured by the temperature sensor with lower accuracy to be a normal measured temperature, to control the temperature of the information processing apparatus. With such a temperature control device, the error in the temperature sensor with lower accuracy is corrected. It is stated that, even when using a low-cost temperature sensor, it is possible to control the temperature of the information processing apparatus accurately.

JP 2019-029141 A discloses a sensor selection device equipped with a temperature detection unit and a selection unit. The temperature detection unit detects a temperature of a battery using a plurality of temperature sensors provided around the battery, and the selection unit selects, among the plurality of temperature sensors, two or more temperature sensors that are used for measuring the temperature of at least one of a high-temperature side or a low-temperature side of the battery based on the temperature of the battery detected by the temperature detection unit. The selection unit allows the selected temperature sensors as high-temperature-side sensor information or low-temperature-side sensor information to be stored into a non-volatile storage. The sensor selection device is said to be able to select temperature sensors appropriately.

SUMMARY

The output power, charging and discharging, etc., of a secondary battery may be controlled based on the temperature of the secondary battery. When this is the case, it is desirable that the measurement error of the temperature of the secondary battery be reduced as small as possible.

According to the present disclosure, a temperature detection device (1) includes: a first voltage divider circuit configured to apply a reference potential with respect to a base potential to a series circuit including a first temperature sensor disposed at a predetermined measurement point of a secondary battery and a first pull-up resistor connected in series to the first temperature sensor, and configured to output a voltage applied to the first temperature sensor; a second voltage divider circuit configured to apply a reference potential with respect to a base potential to a series circuit including a second temperature sensor disposed at a predetermined measurement point of the secondary battery and a second pull-up resistor connected in series to the second temperature sensor, and configured to output a voltage applied to the second temperature sensor; and a controller controlling detection of a temperature based on an output of the first voltage divider circuit and an output of the second voltage divider circuit. The first pull-up resistor has a resistance value corresponding to a resistance value of the first temperature sensor that is at a predetermined first temperature. The second pull-up resistor has a resistance value corresponding to a resistance value of the second temperature sensor that is at a predetermined second temperature, the second temperature being lower than the first temperature. The controller is configured to select an output used for detection of temperature according to a temperature of the measurement point that is detected based on a voltage of the first temperature sensor or a voltage of the second temperature sensor. The just-described temperature detection device is able to detect the temperature of the secondary battery accurately.

A temperature detection device (2) disclosed herein is such that the above-described temperature detection device (1) further includes a switching element that switches connection between the first voltage divider circuit and the second voltage divider circuit. The switching element is configured to output the output of the first voltage divider circuit when the temperature of the measurement point is higher than a predetermined switching temperature and to output the output of the second voltage divider circuit when the temperature of the measurement point is lower than the switching temperature.

A temperature detection device (3) disclosed herein is such that, in the above-described temperature detection device (2), the switching temperature includes a first switching temperature for switching connection from the first voltage divider circuit to the second voltage divider circuit, and a second switching temperature that is different from the first switching temperature, for switching connection from the second voltage divider circuit to the first voltage divider circuit.

A temperature detection device (4) disclosed herein is such that the above-described temperature detection device (1) further includes a weighting table that weights the output of the first voltage divider circuit and the output of the second voltage divider circuit based on the temperature of the secondary battery that is detected based on the voltage of the first temperature sensor or the voltage of the second temperature sensor. The temperature detection device (4) is configured to add together the weighted output of the first voltage divider circuit and the weighted output of the second voltage divider circuit that are weighted based on the weighting table, and output a sum of the weighted outputs.

A temperature detection device (5) disclosed herein is such that, in the above-described temperature detection device (4), the weighting table sets a predetermined first reference temperature and a predetermined second reference temperature that is lower than the first reference temperature. The temperature detection device (5) is configured to output the output of the first voltage divider circuit when the temperature of the secondary battery is higher than or equal to the first reference temperature, to output the output of the second voltage divider circuit when the temperature of the secondary battery is less than or equal to the second reference temperature, and to add together the weighted output of the first voltage divider circuit and the weighted output of the second voltage divider circuit and output a sum of the weighted output of the first voltage divider circuit and the weighted output of the second voltage divider circuit when the temperature of the secondary battery is lower than the first reference temperature and higher than the second reference temperature.

A temperature detection device (6) disclosed herein is such that, in the above-described temperature detection device (5), the weighting table is configured to linearly interpolate the output of the first voltage divider circuit and the output of the second voltage divider circuit in a temperature range between the first reference temperature and the second reference temperature.

A temperature detection device (7) disclosed herein is such that, in any one of the above-described temperature detection devices (1) to (6), the first temperature sensor and the second temperature sensor have identical temperature-resistance characteristics.

DETAILED DESCRIPTION

Hereinbelow, embodiments of the technology according to the present disclosure will be described with reference to the drawings. It should be noted, however, that the disclosed embodiments are, of course, not intended to limit the disclosure. The drawings are depicted schematically and do not necessarily accurately depict actual objects. The features and components that exhibit the same effects are designated by the same reference symbols as appropriate, and the description thereof will not be repeated as appropriate.
Temperature Detection Device 1

A temperature detection device 1 is a device for detecting a temperature of a predetermined measurement point in a secondary battery. In the present description, the term "secondary battery" refers to a repeatedly chargeable electricity storage device in general, and it is intended to encompass what is called storage batteries (chemical cells), such as lithium-ion secondary batteries, nickel-metal hydride batteries, and nickel-cadmium batteries, as well as capacitors (i.e., physical cells) such as electric double-layer capacitors.

Figure 1:
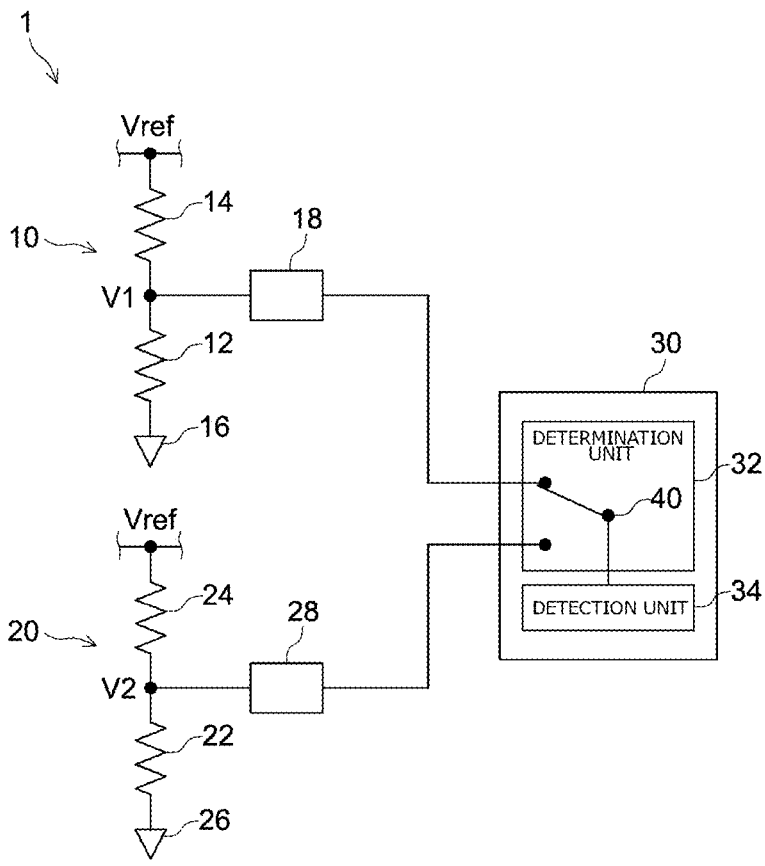
FIG. 1 is a schematic view illustrating a temperature detection device 1.

FIG. 1 is a schematic view illustrating a temperature detection device 1. As illustrated in FIG. 1, the temperature detection device 1 includes a first voltage divider circuit 10 and a second voltage divider circuit 20. The temperature detection device 1 further includes a controller 30 that controls detection of a temperature. The temperature detection device 1 further includes a switching element 40 that switches connection between the first voltage divider circuit 10 and the second voltage divider circuit 20. The first voltage divider circuit 10 includes a first temperature sensor 12. The second voltage divider circuit 20 includes a second temperature sensor 22.

For the temperature sensors (the first temperature sensor 12 and the second temperature sensor 22), it is possible to use contact-type temperature sensors that have temperature-resistance characteristics such that the resistance value changes according to change of temperature. Those that detect temperature without utilizing temperature-resistance characteristics, such as thermocouples, are not included in the temperature sensors in the present description. For the temperature sensors, it is possible to use, for example, thermistors, resistance thermometer bulbs, and the like. Examples of usable thermistors include negative temperature coefficient (NTC) thermistors, in which the resistance value decreases as the temperature increases, and positive temperature coefficient (PTC) thermistors, in which the resistance value increases as the temperature increases. Examples of usable resistance thermometer bulbs include platinum resistance thermometer bulbs, nickel resistance thermometer bulbs, and copper resistance thermometer bulbs. The temperature sensor to be used may be determined according to the temperature range of a secondary battery, in which the secondary battery can be used. For the temperature sensors, it is preferable to use thermistors that show a large change in resistance values with respect to a change in temperature. In this embodiment, NTC thermistors are used for the first temperature sensor 12 and the second temperature sensor 22.

The first voltage divider circuit 10 includes a first thermistor 12 and a first pull-up resistor 14 connected in series to each other. The first thermistor 12 is disposed at a predetermined measurement point in the secondary battery. An end of the first thermistor 12 that is opposite the first pull-up resistor 14 is connected to a base potential point 16. The first voltage divider circuit 10 is configured to apply a reference voltage Vref with respect to the base potential to a series circuit in which the first thermistor 12 and the first pull-up resistor 14 are connected in series to each other.

A first A/D converter 18 is connected to a connection point between the first thermistor 12 and the first pull-up resistor 14 via a voltage measurer, not shown in the drawings. A voltage V1, which is applied to the first thermistor 12, is output to the first A/D converter 18. A thermistor changes its resistance values according to a change in temperature. By measuring the resistance value of the thermistor disposed at a measurement point, the temperature of the measurement point is measured. The first A/D converter 18 is configured to convert the voltage V1 applied to the first thermistor 12 into temperature information and to output the converted temperature information to the controller 30.

Like the first voltage divider circuit 10, the second voltage divider circuit 20 includes a second pull-up resistor 24 and a second thermistor 22 connected in series to each other. The second thermistor 22 is disposed at a predetermined measurement point in the secondary battery. In the secondary battery that is the measurement object, the second thermistor 22 may be disposed at the same location as the first thermistor 12 or may be disposed at a different location from the first thermistor 12. An end of the second thermistor 22 that is opposite the second pull-up resistor 24 is connected to a base potential point 26. The second voltage divider circuit 20 is configured to apply a reference voltage Vref with respect to the base potential to a series circuit in which the second thermistor 22 and the second pull-up resistor 24 are connected in series to each other. In this embodiment, the first voltage divider circuit 10 and the second voltage divider circuit 20 are configured so that the base potential and the reference voltage Vref are the same value.

A second A/D converter 28 is connected to a connection point between the second thermistor 22 and the second pull-up resistor 24 via a voltage measurer, not shown in the drawings. A voltage V2, which is applied to the second thermistor 22, is output to the second A/D converter 28. The second A/D converter 28 is configured to convert the voltage V2 applied to the second thermistor 22 into temperature information and to output the converted temperature information to the controller 30.

In the first voltage divider circuit 10 and the second voltage divider circuit 20 with the above-described configuration, the relationship between the voltage V applied to the thermistor, the reference voltage Vref, the resistance value Rth of the thermistor, and the resistance value Rpu of the pull-up resistor is represented by the following equation.

$$V=[Rth/(Rpu+Rth)]Vref$$

The reference voltage Vref and the resistance value Rpu of the pull-up resistor are not affected by temperature changes at the measurement point. Therefore, the resistance value Rth of the thermistor can be obtained from the voltage V applied to the thermistor. The temperature of the measurement point can be measured from the relationship between the resistance value Rth of the thermistor and the temperature. However, the measurement of the temperature may cause measurement errors.

According to the present inventors' knowledge, one of the causes of the measurement errors is an error originating from the structure of the voltage divider circuit. In the case where the resistance value Rth of the thermistor is converted into voltage information by a voltage divider circuit, the measurement error becomes greater when the amount of change of the voltage information is greater relative to the amount of change of the resistance value Rth of the thermistor. According to a study by the present inventors, the amount of change of the voltage information of the voltage divider circuit relative to the amount of change of the resistance value Rth of the thermistor is smaller when Rth/(Tpu+Rth) is closer to ½ and is greater when Rth/(Tpu+Rth) is farther from ½. This means that the temperature measurement error originating from voltage information is smaller when the resistance value Rth of the thermistor and the resistance value Rpu of the pull-up resistor are closer to each other but is greater when they are farther apart from each other. For this reason, in order to make the temperature measurement error smaller, it is desirable to select the thermistor and the pull-up resistor so that the resistance value Rth of the thermistor and the resistance value Rpu of the pull-up resistor are close to each other in the temperature range in which the temperature is measured.

In the first voltage divider circuit 10 and the second voltage divider circuit 20, the thermistors and the pull-up resistors are selected so that the resistance values Rth of the thermistors and the resistance values Rpu of the pull-up resistors are close to each other in the respective different temperature ranges. For the first voltage divider circuit 10 and the second voltage divider circuit 20, the first voltage divider circuit 10 is designed so that, for example, the resistance values of the first thermistor 12 and the first pull-up resistor 14 are close to each other in a temperature range near room temperature (at about 25° C.). The second voltage divider circuit 20 is designed so that the resistance values of the second thermistor 22 and the second pull-up resistor 24 are close to each other in a temperature range lower than that for the first voltage divider circuit 10.

For the first pull-up resistor 14, a resistor having a resistance value corresponding to the resistance value of the first thermistor 12 that is at a predetermined first temperature is selected. For the second pull-up resistor 24, a resistor is selected that has a resistance value corresponding to the resistance value of the second thermistor 22 that is at a predetermined second temperature that is lower than the first temperature. Herein, the first thermistor 12 and the first pull-up resistor 14 are selected so that their resistance values are close to each other at the predetermined first temperature. The second thermistor 22 and the second pull-up resistor 24 are selected so that their resistance values are close to each other at the predetermined second temperature, which is lower than the first temperature.

In this embodiment, the temperature detection device 1 measures the temperature of a measurement point in an automotive-use secondary battery. Herein, it is assumed that the temperature of the secondary battery when the vehicle is in use is in a temperature range from about −30° C. to about 60° C.

In this embodiment, the first temperature is set to be 25° C. Herein, a thermistor having a resistance value of 10 kΩ at 25° C. and a resistance value of 100 kΩ at −10° C. is used as the first thermistor 12. The first pull-up resistor 14 has a resistance value corresponding to the resistance value of the first thermistor 12 that is at the first temperature, 25° C. (10 kΩ in this embodiment). The resistance value of the first pull-up resistor 14 is approximately constant irrespective of temperature. As a result, in the vicinity of the first temperature 25° C., it is possible to reduce the measurement error of the temperature that is measured based on the resistance value of the first thermistor 12. The temperature measurement error becomes greater when the temperature is further away from the first temperature 25° C.

This embodiment uses, as the second thermistor 22, a thermistor having an identical temperature-resistance characteristic as that of the first thermistor 12. As mentioned above, the second thermistor 22 has a resistance value of 10 kΩ at 25° C. but a resistance value of 100 kΩ at −10° C. The second pull-up resistor 24 has a resistance value corresponding to the resistance value of the second thermistor 22 that is at the second temperature, −10° C. (100 kΩ in this embodiment). The resistance value of the second pull-up resistor 24 is approximately constant irrespective of temperature. This makes it possible to reduce the measurement error of the temperature measured based on the resistance value of the second thermistor 22 in the vicinity of the second temperature, −10° C. The temperature measurement error becomes greater when the temperature is more distant from the second temperature, −10° C.

Figure 2:
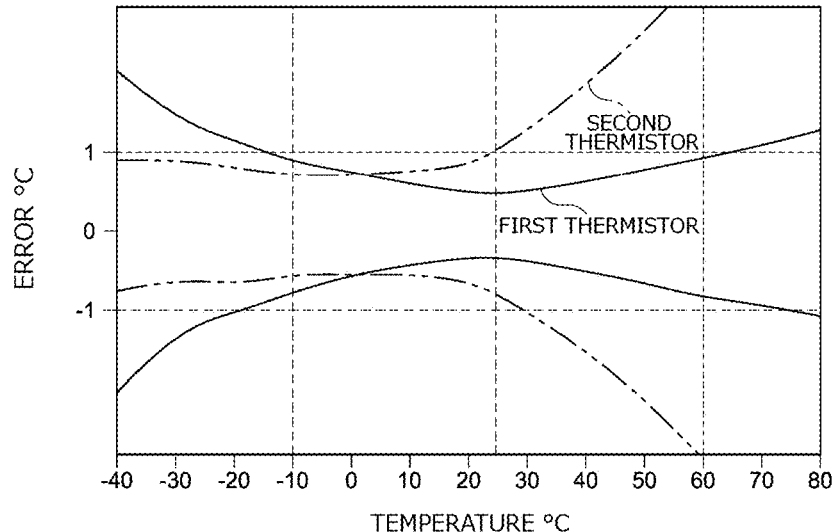
FIG. 2 is a graph illustrating temperature measurement errors.

FIG. 2 is a graph illustrating temperature measurement errors. In FIG. 2, the measurement errors based on the resistance value of the first thermistor 12 are indicated by solid lines, and the measurement errors based on the resistance value of the second thermistor 22 are indicated by dash-dot-dot lines. FIG. 2 shows the upper limit and the lower limit of the calculated measurement error values of temperature, which are calculated from the errors originating from the voltage divider circuits, the B constants of the thermistors 12 and 22, and the product allowable errors of the thermistors 12 and 22 and the pull-up resistors 14 and 24. Because the measurement errors can be calculated by known methods, detailed description thereof will not be discussed herein. It should be noted that, because the temperature measurement error may result from various causes, they are not necessarily fall within the upper limit and the lower limit shown in FIG. 2.

As illustrated in FIG. 2, the measurement error based on the resistance value of the first thermistor 12 can be reduced to 1° C. or less in the range from −10° C. to 60° C. On the other hand, the measurement error based on the resistance value of the first thermistor 12 may be greater than 1° C. in the range lower than ~10° C. and in the range higher than 60° C. The measurement error based on the resistance value of the second thermistor 22 can be reduced to 1° C. or less in the range from −40° C. to 20° C. On the other hand, the measurement error based on the resistance value of the second thermistor 22 may be greater than 1° C. in the range lower than ~40° C. (not shown) and in the range higher than 20° C.

The controller 30 (see FIG. 1) controls detection of the temperature at the measurement point based on an output of the first voltage divider circuit 10 and an output of the second voltage divider circuit 20. In this embodiment, the controller 30 selects either one of the output of the first voltage divider circuit 10 and the output of the second voltage divider circuit 20. Herein, the controller 30 is configured to select the output of the first voltage divider circuit 10 when the temperature of the measurement point is close to the first temperature and select the output of the second voltage divider circuit 20 when the temperature of the measurement point is close to the second temperature.

The controller 30 may be, for example, a microcomputer. The controller 30 includes, for example, a communication interface, a CPU, a ROM, and a ROM. As illustrated in FIG. 1, the controller 30 includes a determination unit 32 and a detection unit 34. The determination unit 32 and the detection unit 34 may be implemented by, for example, a plurality of processors. The determination unit 32 is communicably connected to the first A/D converter 18 and the second A/D converter 28. The determination unit 32 includes a switching element 40. The detection unit 34 is configured to be communicable with the determination unit 32. The detection unit 34 is configured to be communicable with the first A/D converter 18 and the second A/D converter 28 via the switching element of the determination unit 32.

The determination unit 32 determines one of the outputs of the first voltage divider circuit 10 and from the second voltage divider circuit 20 that is to be used for detecting the temperature of the measurement point. In this embodiment, the determination unit 32 selects an output according a temperature t of the measurement point that is detected based on the voltage V1 of the first thermistor 12. The determination unit 32 is not limited to such an embodiment, but may select the output according to the temperature t that is detected based on the voltage V2 of the second thermistor 22.

In this embodiment, the output is selected by a switching operation of the switching element 40. The switching element 40 performs a switching operation of switching connection between the first voltage divider circuit 10 and the second voltage divider circuit 20 in response to an instruction from the determination unit 32. The switching element 40 is configured to output the output of the first voltage divider circuit when the temperature of the measurement point is higher than a predetermined switching temperature and to output the output of the second voltage divider circuit 20 when the temperature of the measurement point is lower than the predetermined switching temperature. The switching element 40 may be, but is not particularly limited to, a semiconductor switch, for example.

In this embodiment, the switching temperature may include a first switching temperature T1 and a second switching temperature T2. The first switching temperature T1 is a temperature for switching from the first voltage divider circuit 10 to the second voltage divider circuit 20. The first switching temperature T1 is set to be −10° C. The second switching temperature T2 is a temperature for switching from the second voltage divider circuit 20 to the first voltage divider circuit 10. The second switching temperature T2 is set to be 0° C. It is preferable that the first switching temperature T1 and the second switching temperature T2 be set to have an appropriate temperature difference so that so-called hysteresis control can be performed. The difference between the first switching temperature T1 and the second switching temperature T2 is preferably set to greater than or equal to 3° C., and may be set to greater than or equal to 5° C. The difference between the first switching temperature T1 and the second switching temperature T2 is preferably set to less than or equal to 20° C., and may be set to less than or equal to 15° C.

Figure 3:
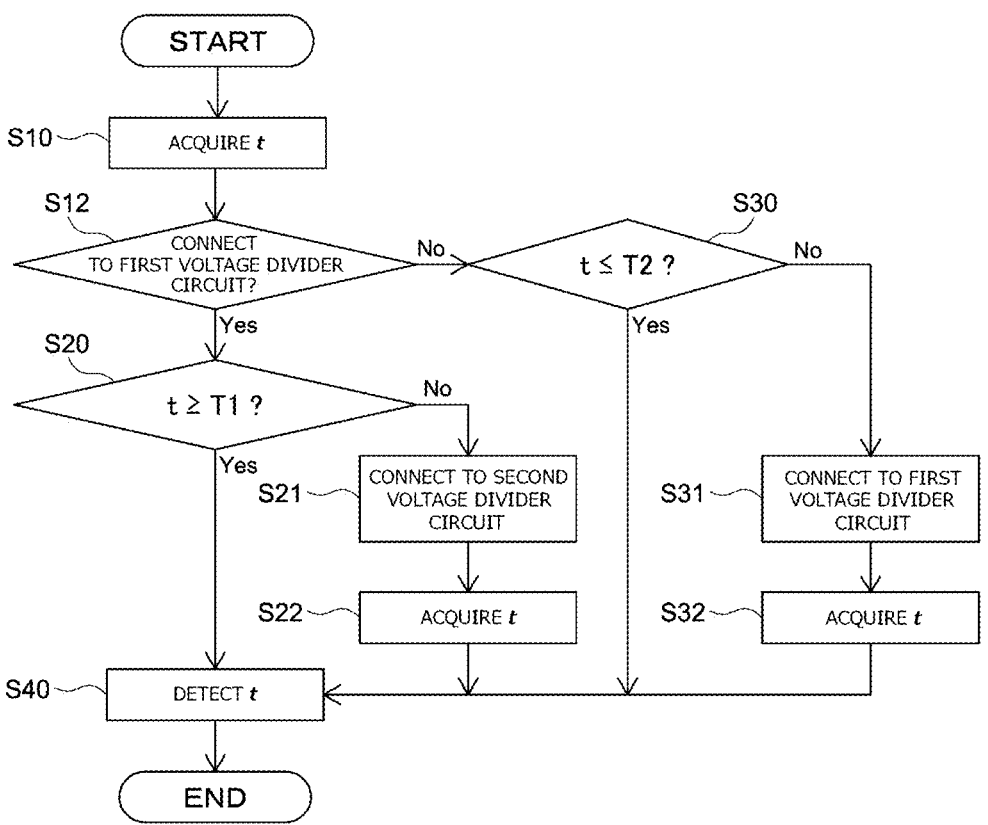
FIG. 3 is a flowchart illustrating a process executed by a controller 30.

Hereinafter, an example is described of the process executed by the controller 30 when the temperature detection device 1 detects temperature, but this is not intended to limit the present disclosure to such an embodiment. FIG. 3 is a flowchart illustrating a process executed by the controller 30. Such a process may be started when an electric vehicle is started up. The temperature of the automotive-use secondary battery may be detected at predetermined intervals during the time when the vehicle is started, irrespective of whether the electric vehicle is travelling or at standstill.

As illustrated in FIG. 3, the determination unit 32 of the controller 30 acquires, at first, the temperature t of the measurement point (S10). Next, the determination unit 32 determines whether or not the temperature t is in a temperature range in which the switch should be switched (S12).

If the setting of the switch is for the first voltage divider circuit 10 (Yes), the determination unit 32 determines whether or not the temperature t is higher than or equal to the first switching temperature T1 (S20). When the temperature t is higher than or equal to the first switching temperature T1 (Yes), the temperature information of the first voltage divider circuit 10 should be output, so it is unnecessary to switch the connection target of the detection unit 34. The detection unit 34 detects the temperature t measured by the first voltage divider circuit 10 as the temperature of the measurement point (S40).

When the temperature t measured by the first voltage divider circuit 10 is not higher than or equal to the first switching temperature T1 in the determination (S20), the determination unit 32 selects the output of the second voltage divider circuit 20 (S21) and acquires the temperature t again (S22). The detection unit 34 detects the temperature t measured by the second voltage divider circuit 20 as the temperature of the measurement point (S40).

If the detection unit 34 is connected to the second voltage divider circuit 20 (No) in the determination S12, the determination unit 32 determines whether or not the temperature t measured by the second voltage divider circuit 20 is lower than or equal to higher than or equal to the second switching temperature T2 (S30). When the temperature t is less than or equal to the second switching temperature T2 (Yes), the temperature information of the second voltage divider circuit 20 should be output, so it is unnecessary to switch the connection target of the detection unit 34. The detection unit 34 detects the temperature t measured by the second voltage divider circuit 20 as the temperature of the measurement point (S40).

When the temperature t measured by the second voltage divider circuit 20 is not less than or equal to the second switching temperature T2 (No) in the determination (S30), the determination unit 32 selects the output of the first voltage divider circuit 10 (S31) and acquires the temperature t again (S32). The detection unit 34 detects the temperature t measured by the first voltage divider circuit 10 as the temperature of the measurement point (S40).

In the automotive-use secondary battery, various control operations are performed according to the temperature. For example, the charge-discharge current during charging and discharging of the secondary battery, the output power during travel, and so forth may be controlled depending on the temperature of the secondary battery. When the measurement error of the temperature of the secondary battery is large, it is possible that the secondary battery may be excessively charged or excessively discharged or that an overcurrent may flow therethrough. As a consequence, undesirable events may occur that, for example, deterioration of the secondary battery worsens. For this reason, it is desirable that the temperature of the secondary battery be detected accurately.

According to the present disclosure, the temperature detection device 1 includes a first voltage divider circuit 10, a second voltage divider circuit 20, and a controller 30. The first voltage divider circuit 10 includes a first thermistor 12 disposed at a predetermined measurement point in a secondary battery, and a first pull-up resistor 14 connected in series to the first thermistor 12. The second voltage divider circuit 20 includes a second thermistor 22 disposed at a predetermined measurement point in the secondary battery, and a second pull-up resistor 24 connected in series to the second thermistor 22. The controller controls detection of a temperature based on the outputs of the first voltage divider circuit 10 and the second voltage divider circuit 20. The first pull-up resistor 14 has a resistance value corresponding to the resistance value of the first thermistor 12 that is at a predetermined first temperature. The second pull-up resistor 24 has a resistance value corresponding to the resistance value of the second thermistor 22 that is at a predetermined second temperature being lower than the first temperature. The controller 30 is configured to select an output used for detection of temperature according to the temperature of the measurement point that is detected based on the voltage V1 of the first thermistor 12.

In such a temperature detection device 1, the second pull-up resistor 24 of the second voltage divider circuit 20 has a resistance value corresponding to the resistance value of the second thermistor 22 that is at the predetermined second temperature, which is lower than the first temperature. This enables the second voltage divider circuit 20 to reduce the temperature measurement error in a lower temperature range more easily, in comparison with the first voltage divider circuit 10. According to the temperature t that is detected based on the voltage V1 of the first thermistor 12 or the voltage V2 of the second thermistor 22, the output of the first voltage divider circuit 10 is selected when the temperature of the measurement point is high, whereas the output of the second voltage divider circuit 20 is selected when the temperature of the measurement point is low. Because either the output of the first voltage divider circuit 10 or the output of the second voltage divider circuit 20 is selected appropriately according to the temperature, the accuracy of temperature measurement is improved over a wide temperature range.

Moreover, because voltage is measured with a plurality of voltage divider circuits, it may be possible to detect a failure of the voltage divider circuits. For example, when one of the voltage divider circuits is in failure, there may be a large difference between the temperature detected based on the voltage V1 measured with the first voltage divider circuit 10 and the temperature detected based on the voltage V2 measured with the second voltage divider circuit 20. The temperature detection device 1 may be configured to be able to determine a failure of the voltage divider circuits by determining such a temperature difference.

In the above-described embodiment, the temperature detection device 1 further includes a switching element 40 that switches connection between the first voltage divider circuit 10 and the second voltage divider circuit 20. The switching element 40 is configured to output the output of the first voltage divider circuit 10 when the temperature of the measurement point is higher than a predetermined switching temperature and to output the output of the second voltage divider circuit 20 when the temperature of the measurement point is lower than the switching temperature. The use of the switching element 40 may achieve a circuit configuration that makes it possible to accurately detect the temperature with a simple configuration.

The switching temperature includes a switching temperature T1 for switching connection from the first voltage divider circuit 10 to the second voltage divider circuit 20, and a switching temperature T2 that is different from the first switching temperature T1, for switching connection from the second voltage divider circuit 20 to the first voltage divider circuit 10. In other words, two switching temperatures are provided corresponding to the switching directions between the first voltage divider circuit 10 and the second voltage divider circuit 20. This makes it less likely to cause an event that the output sources (i.e., the first voltage divider circuit 10 and the second voltage divider circuit 20) are frequently switched in the vicinity of the switching temperature. As a result, it is unlikely to cause sudden changes of the detected temperature that originate from switching of the circuit that detects the temperature. For example, the permissible value of charge-discharge current is greatly dependent on the temperature of the secondary battery. Preventing sudden changes of temperature makes it less likely to cause undesirable events such as changes in output power resulting from sudden changes of the permissible value of charge-discharge current and unintended overcharging and overdischarging.

In the foregoing embodiment, the first thermistor 12 and the second thermistor 22 have identical characteristics. This serves to prevent performance variations between the first thermistor 12 and the second thermistor 22, making it possible to improve the reliability of the detected temperature. In addition, because the measurement accuracy in different temperature ranges can be controlled by merely changing the resistance values of the first pull-up resistor 14 and the second pull-up resistor 24, circuit designing becomes easier. It should be noted that the phrase "identical temperature-resistance characteristics" does not mean that the two thermistors need to have completely identical temperature-resistance characteristics, but they are permitted to have errors or the like originating from variations in the performance of the products.

Figure 4:
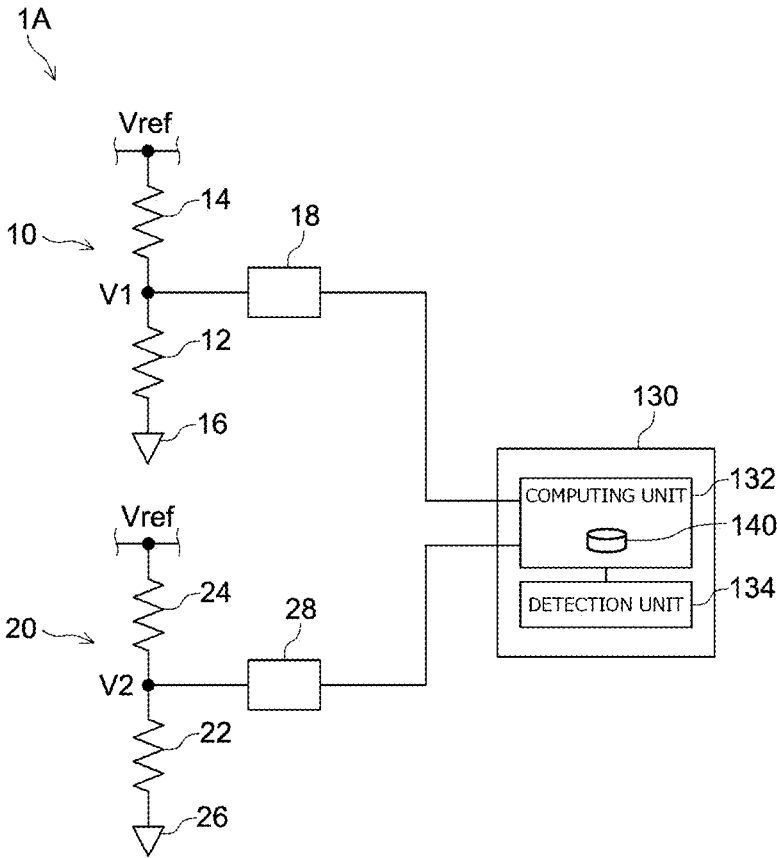
FIG. 4 is a schematic view illustrating a temperature detection device 1A.

Hereinbelow, a temperature detection device 1A according to another embodiment will be described. FIG. 4 is a schematic view illustrating the temperature detection device 1A. As illustrated in FIG. 4, the temperature detection device 1A, similar to the temperature detection device 1, includes a first voltage divider circuit 10 and a second voltage divider circuit 20. The first voltage divider circuit 10 and the second voltage divider circuit 20 are connected to the first A/D converter 18 and the second A/D converter 28, respectively. The temperature detection device 1A further includes a controller 130 that controls detection of a temperature. In this embodiment, the temperature detection device 1A further includes a weighting table 140 that weights the output of the first voltage divider circuit 10 and the output of the second voltage divider circuit 20.

The controller 130 includes a computing unit 132 and a detection unit 134. The controller 130 may be, for example, a microcomputer. The computing unit 132 and the detection unit 134 may be implemented by, for example, a plurality of processors. The weighting table 140 is stored in the computing unit 132. The computing unit 132 is communicably connected to the first A/D converter 18 and the second A/D converter 28. The detection unit 134 is configured to be communicable with the computing unit 132.

The weighting table 140 weights the output of the first voltage divider circuit 10 and the output of the second voltage divider circuit 20 based on the temperature of the secondary battery that is detected based on the voltage V1 of the first thermistor 12. The computing unit 132 adds together the output of the first voltage divider circuit 10 and the output of the second voltage divider circuit 20 that are weighted based on the weighting table 140. The detection unit 134 detects the output that has been computed by the computing unit 132.

Figure 5:
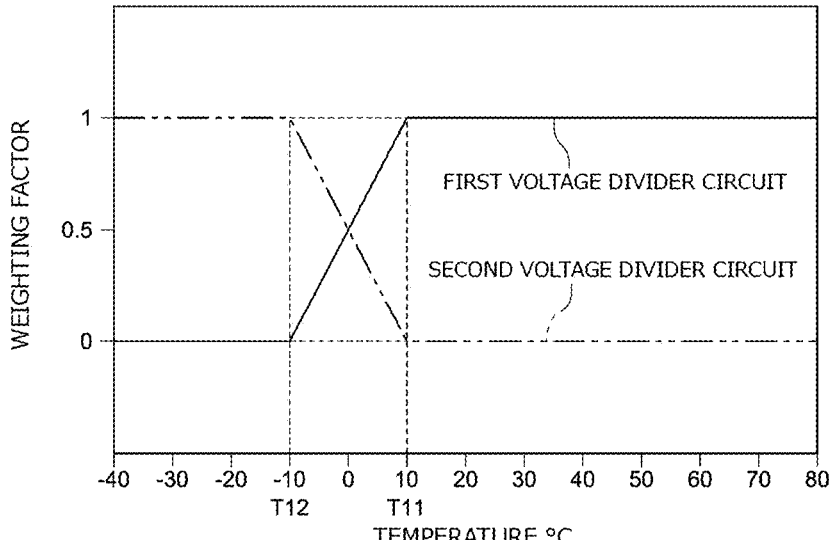
FIG. 5 is a graph illustrating weighting factors.

In this embodiment, the weighting table 140 stores temperatures of the secondary battery that are detected based on the voltage V1 of the first thermistor 12 and weighting factors in association with each other. FIG. 5 is a graph illustrating weighting factors. In FIG. 5, the weighting factor by which the output of the first voltage divider circuit 10 is multiplied is indicated by the solid line, and the weighting factor by which the output of the second voltage divider circuit 20 is multiplied is indicated by the dash-dot-dot line. As illustrated in FIG. 5, the weighting table 140 sets the weighting factors so that the sum of the weighting factor by which the output of the first voltage divider circuit 10 is multiplied and the weighting factor by which the output of the second voltage divider circuit 20 is multiplied becomes 1.

The weighting table 140 sets a predetermined first reference temperature T11 and a predetermined second reference temperature T12 that is lower than the first reference temperature T11. The temperature detection device 1A is configured to output the output of the first voltage divider circuit 10 when the temperature of the secondary battery is higher than or equal to the first reference temperature T11. The temperature detection device 1A is configured to output the output of the secondary battery when the temperature of the secondary battery is less than or equal to the second reference temperature T12. The temperature detection device 1A is configured to add together the weighted output of the first voltage divider circuit 10 and the weighted output of the second voltage divider circuit when the temperature of the secondary battery is lower than the first reference temperature T11 and higher than the second reference temperature T12. In this embodiment, the first reference temperature T11 is 10° C. and the second reference temperature T12 is −10° C., although the first reference temperature T11 and the second reference temperature T12 are not limited thereto. When the temperature of the measurement point is higher than or equal to the first reference temperature T11, 10° C., the weighting factor for the output of the first voltage divider circuit 10 is 1, and the weighting factor for the output of the second voltage divider circuit 20 is 0. When the temperature of the measurement point is less than or equal to the second reference temperature T12, −10° C., the weighting factor for the output of the first voltage divider circuit 10 is 0, and the weighting factor for the output of the second voltage divider circuit 20 is 1.

In the temperature range between the first reference temperature T11 and the second reference temperature T12, the weighting factor is set so that the output of the first voltage divider circuit 10 and the output of the second voltage divider circuit 20 are linearly interpolated. For example, when the temperature of the measurement point is 5° C., the weighting factor for the output of the first voltage divider circuit 10 is 0.75, and the weighting factor for the output of the second voltage divider circuit 20 is 0.25. When the temperature of the measurement point is 0° C., both the weighting factors for the outputs of the first voltage divider circuit 10 and the second voltage divider circuit 20 are 0.5. For example, when the temperature of the measurement point is −5° C., the weighting factor for the output of the first voltage divider circuit 10 is 0.25, and the weighting factor for the output of the second voltage divider circuit 20 is 0.75. It should be noted that the weighting factor may not necessarily be obtained by linear interpolation, but may be obtained by non-linear interpolation such as polynomial interpolation. Moreover, the first reference temperature T11, the second reference temperature T12, and the weighting factor may be configured to be set automatically or manually, as appropriate, according to the temperature of the environment in which the secondary battery is used.

In the above-described embodiment, the temperature detection device 1A includes the weighting table 140 that weights the output of the first voltage divider circuit 10 and the output of the second voltage divider circuit 20 based on the temperature of the secondary battery that is detected based on the voltage V1 of the first thermistor 12. The temperature detection device 1A is configured to add together the output of the first voltage divider circuit 10 and the output of the second voltage divider circuit 20 that are weighted based on the weighting table 140. As a result, the output of the first voltage divider circuit 10 and the output of the second voltage divider circuit 20 are seamlessly switched one to the other even when the temperature of the measurement point changes. In other words, it is possible to smoothly switch the output of the first voltage divider circuit 10 and the output of the second voltage divider circuit 20 from one to the other. This makes it unlikely to cause a sudden change in the measured temperature originating from the switching between the first voltage divider circuit 10 and the second voltage divider circuit 20 even when, for example, the measurement errors vary differently between the first voltage divider circuit and the second voltage divider circuit 20. This makes it even less likely to cause undesirable events such as described above, such as changes in output power resulting from sudden changes of the permissible value of charge-discharge current and unintended overcharging and overdischarging.

In the above-described temperature detection devices 1 and 1A, the first thermistor 12 and the second thermistor 22 are disposed at a predetermined measurement point, but the location of the measurement point is not limited to any particular location. The first thermistor 12 and the second thermistor 22 may be disposed at the same location in the secondary battery so that the temperature of the same measurement point can be measured. Alternatively, the first thermistor 12 and the second thermistor 22 may be disposed at different locations in the secondary battery so that the temperatures of different measurement points can be measured. For example, it is possible that the first thermistor 12 of the first voltage divider circuit 10, which shows higher measurement accuracy in a higher temperature range, may be disposed at a location in which heat is likely to accumulate, while the second thermistor 22 of the second voltage divider circuit 20, which shows higher measurement accuracy in a lower temperature range, may be disposed at a location in which heat is less likely to accumulate. For example, when the secondary battery used is a battery pack in which a plurality of battery cells are connected and arrayed, heat is more likely to accumulate in ones of the battery cells that are located closer to the central portion along the direction in which the battery cells are arrayed, and heat is more likely to be dissipated from the battery cells that are located closer to the end portions. In such a case, the first voltage divider circuit 10 may be provided at the central portion and the second voltage divider circuit 20 may be provided at the end portions so that accuracy of temperature measurement can be improved for each of the portions.

It is also possible that the outputs of the first voltage divider circuit 10 and the second voltage divider circuit 20 may be selected according to the situation in which the secondary battery is used. For example, in an automotive-use secondary battery, the temperature of the secondary battery may decrease when the secondary battery is in a certain output power level or lower for a predetermined time, such as when the vehicle is parked in an environment where the outside air temperature is sufficiently low. In this case, the temperature may be measured using only the output of the second voltage divider circuit 20, which shows higher measurement accuracy in a lower temperature range. In such a case, accuracy of temperature measurement may be improved by using only the output of the second voltage divider circuit 20.

In the foregoing embodiments, the first thermistor 12 and the second thermistor 22 have substantially identical temperature-resistance characteristics. The temperature detection device is configured to be able to improve the measurement accuracy in different temperature ranges by changing the resistance values of the first pull-up resistor 14 and the second pull-up resistor 24. However, such embodiments are merely illustrative. For example, it is possible to select a first thermistor 12 and a second thermistor 22 that have different temperature-resistance characteristics from each other so that the measurement accuracy can be improved in a desired temperature range. For example, for the thermistor provided for measuring a portion that may be brought to a low temperature, it is possible to use a thermistor such that variations in measurement errors are small in a low temperature range.

In each of the temperature detection devices 1 and 1A, the number of the first voltage divider circuit 10 and the second voltage divider circuit 20 is not limited to one. Each of the temperature detection devices 1 and 1A may be provided with a plurality of first voltage divider circuits 10 and a plurality of second voltage divider circuits 20. Each of the temperature detection devices 1 and 1A may be configured to detect a temperature from the average of the outputs of the plurality of first voltage divider circuits 10 and the average of the outputs of the plurality of second voltage divider circuits 20. The plurality of first voltage divider circuits 10 and the plurality of second voltage divider circuits 20 may be disposed so that different locations in the secondary battery can be measured. When the plurality of first voltage divider circuits 10 and the plurality of second voltage divider circuits 20 are provided, the reliability of the detected temperatures may be improved.

In the foregoing embodiments, each of the temperature detection devices 1 and 1A is provided with the first voltage divider circuit 10 and the second voltage divider circuit 20. The temperature detection devices 1 and 1A may each further be provided with an additional voltage divider circuit, in addition to the first voltage divider circuit 10 and the second voltage divider circuit 20. The additional voltage divider circuit may include a thermistor and a pull-up resistor such that their resistance values are set to achieve higher temperature measurement accuracy in a different temperature range from those of the first voltage divider circuit 10 and the second voltage divider circuit 20. For example, the temperature detection devices 1 and 1A may each include a third voltage divider circuit in which a thermistor and a pull-up resistor are selected to have resistance values such as to improve measurement accuracy in a different temperature range from those of the first voltage divider circuit 10 and the second voltage divider circuit 20. By providing an additional voltage divider circuit in this way, the reliability of the detected temperatures may be improved in a wider temperature range.

The above-described temperature detection devices 1 and 1A are able to improve measurement accuracy of the temperature of the secondary battery without employing, for example, highly accurate temperature sensors or complicated circuits for improving measurement accuracy (such as bridge circuits or four terminal circuits). This may serve to reduce the manufacturing costs of the products that incorporate the secondary battery.

Various embodiments of the technology according to the present disclosure have been described hereinabove. Unless specifically stated otherwise, the embodiments described herein do not limit the scope of the present disclosure. It should be noted that various other modifications and alterations may be possible in the embodiments of the technology disclosed herein. In addition, the features, structures, or steps described herein may be omitted as appropriate, or may be combined in any suitable combinations, unless specifically stated otherwise.

What is claimed is:

1. A temperature detection device, comprising:
   a first voltage divider circuit configured to
      apply a first reference potential with respect to a first base potential to a first series circuit, the first series circuit including a first temperature sensor disposed at a predetermined measurement point of a secondary battery, and a first pull-up resistor connected in series to the first temperature sensor, and
      output a first voltage applied to the first temperature sensor;
   a second voltage divider circuit different from the first voltage divider circuit and configured to
      apply a second reference potential with respect to a second base potential to a second series circuit, the second series circuit including a second temperature sensor different from the first temperature sensor and disposed at the predetermined measurement point of the secondary battery, and a second pull-up resistor different from the first pull-up resistor and connected in series to the second temperature sensor, and
      output a second voltage applied to the second temperature sensor; and
   a controller configured to control detection of a temperature based on the first voltage output by the first voltage divider circuit and the second voltage output by the second voltage divider circuit, wherein:
   the first pull-up resistor has a resistance value corresponding to a resistance value of the first temperature sensor that is at a predetermined first temperature;
   the second pull-up resistor has a resistance value corresponding to a resistance value of the second temperature sensor that is at a predetermined second temperature, the predetermined second temperature being lower than the predetermined first temperature; and the controller is configured to select the first voltage output by the first voltage divider circuit or the second voltage output by the second voltage divider circuit for the detection of the temperature according to a temperature of the predetermined measurement point that is detected based on a voltage of the first temperature sensor or a voltage of the second temperature sensor.

2. The temperature detection device according to claim 1, further comprising a switching element configured to switch connection between the first voltage divider circuit and the second voltage divider circuit, wherein the switching element is configured to output the first voltage output by the first voltage divider circuit in response to the temperature of the predetermined measurement point being higher than a predetermined switching temperature and output the second voltage output by the second voltage divider circuit in response to the temperature of the predetermined measurement point being lower than the switching temperature.

3. The temperature detection device according to claim 2, wherein the switching temperature includes a first switching temperature for switching connection from the first voltage divider circuit to the second voltage divider circuit, and a second switching temperature higher than the first switching temperature, for switching connection from the second voltage divider circuit to the first voltage divider circuit, at the predetermined first temperature, a difference between the resistance values of the first temperature sensor and the first pull-up resistor is smaller than a difference between the resistance values of the second temperature sensor and the second pull-up resistor, and at the predetermined second temperature, a difference between the resistance values of the second temperature sensor and the second pull-up resistor is smaller than a difference between the resistance values of the first temperature sensor and the first pull-up resistor.

4. The temperature detection device according to claim 1, further comprising:

a weighting table weighting the first voltage output by the first voltage divider circuit and the second voltage output by the second voltage divider circuit based on the temperature of the predetermined measurement point of the secondary battery that is detected based on the voltage of the first temperature sensor or the voltage of the second temperature sensor, and the temperature detection device being configured to add together a weighted output of the first voltage divider circuit and a weighted output of the second voltage divider circuit that are weighted based on the weighting table, and to output a sum of the weighted outputs.

5. The temperature detection device according to claim 4, wherein:

the weighting table sets a predetermined first reference temperature and a predetermined second reference temperature that is lower than the predetermined first reference temperature; and the temperature detection device is configured to:

output the first voltage output by the first voltage divider circuit in response to the temperature of the predetermined measurement point of the secondary battery being higher than or equal to the predetermined first reference temperature;

output the second voltage output by the second voltage divider circuit in response to the temperature of the predetermined measurement point of the secondary battery being lower than or equal to the predetermined second reference temperature; and add together the weighted output of the first voltage divider circuit and the weighted output of the second voltage divider circuit and output a sum of the weighted output of the first voltage divider circuit and the weighted output of the second voltage divider circuit in response to the temperature of the predetermined measurement point of the secondary battery being lower than the predetermined first reference temperature and higher than the predetermined second reference temperature.

6. The temperature detection device according to claim 5, wherein the weighting table is configured to linearly interpolate the first voltage output by the first voltage divider circuit and the second voltage output by the second voltage divider circuit in a temperature range between the predetermined first reference temperature and the predetermined second reference temperature.

7. The temperature detection device according to claim 1, wherein the first temperature sensor and the second temperature sensor have identical temperature-resistance characteristics.

8. A temperature detection device, comprising:

a first voltage divider circuit configured to apply a first reference potential with respect to a first base potential to a first series circuit including a first temperature sensor disposed at a predetermined measurement point of a secondary battery and a first pull-up resistor connected in series to the first temperature sensor, and output a first voltage applied to the first temperature sensor;

a second voltage divider circuit configured to apply a second reference potential with respect to a second base potential to a second series circuit including a second temperature sensor disposed at the predetermined measurement point of the secondary battery and a second pull-up resistor connected in series to the second temperature sensor, and output a second voltage applied to the second temperature sensor; and a controller configured to control detection of a temperature based on the first voltage output by the first voltage divider circuit and the second voltage output by the second voltage divider circuit, wherein:

the first pull-up resistor has a resistance value corresponding to a resistance value of the first temperature sensor that is at a predetermined first temperature;

the second pull-up resistor has a resistance value corresponding to a resistance value of the second temperature sensor that is at a predetermined second temperature, the predetermined second temperature being lower than the predetermined first temperature;

the controller is configured to select the first voltage output by the first voltage divider circuit or the second voltage output by the second voltage divider circuit for the detection of the temperature according to a temperature of the predetermined measurement point that is detected based on a voltage of the first temperature sensor or a voltage of the second temperature sensor;

the controller configured to access a weighting table weighting the first voltage output by the first voltage divider circuit and the second voltage output by the second voltage divider circuit based on the temperature of the predetermined measurement point of the secondary battery that is detected based on the voltage of the first temperature sensor or the voltage of the second temperature sensor; and the controller is configured to add together a weighted output of the first voltage divider circuit and a weighted output of the second voltage divider circuit that are weighted based on the weighting table, and to output a sum of the weighted outputs.

9. The temperature detection device according to claim 8, wherein:

the weighting table sets a predetermined first reference temperature and a predetermined second reference temperature that is lower than the predetermined first reference temperature; and the temperature detection device is configured to:

output the first voltage output by the first voltage divider circuit in response to the temperature of the predetermined measurement point of the secondary battery being higher than or equal to the predetermined first reference temperature;

output the second voltage output by the second voltage divider circuit in response to the temperature of the predetermined measurement point of the secondary battery being lower than or equal to the predetermined second reference temperature; and add together the weighted output of the first voltage divider circuit and the weighted output of the second voltage divider circuit and output a sum of the weighted output of the first voltage divider circuit and the weighted output of the second voltage divider circuit in response to the temperature of the predetermined measurement point of the secondary battery being lower than the predetermined first reference temperature and higher than the predetermined second reference temperature.

10. The temperature detection device according to claim 9, wherein the weighting table is configured to linearly interpolate the first voltage output by the first voltage divider circuit and the second voltage output by the second voltage divider circuit in a temperature range between the predetermined first reference temperature and the predetermined second reference temperature.

11. The temperature detection device according to claim 8, wherein the first temperature sensor and the second temperature sensor have identical temperature-resistance characteristics.

12. The temperature detection device according to claim 8, wherein at the predetermined first temperature, a difference between the resistance values of the first temperature sensor and the first pull-up resistor is smaller than a difference between the resistance values of the second temperature sensor and the second pull-up resistor, and at the predetermined second temperature, a difference between the resistance values of the second temperature sensor and the second pull-up resistor is smaller than a difference between the resistance values of the first temperature sensor and the first pull-up resistor.

* * * * *